J. HUNT & J. FOULKE.
Vises.

No. 157,450. Patented Dec. 8, 1874.

Witnesses.

Inventor:

UNITED STATES PATENT OFFICE.

JOSHUA HUNT, OF EATON, OHIO, AND JOSHUA FOULKE, OF RICHMOND, INDIANA.

IMPROVEMENT IN VISES.

Specification forming part of Letters Patent No. 157,450, dated December 8, 1874; application filed July 27, 1874.

*To all whom it may concern:*

Be it known that we, JOSHUA HUNT, of Eaton, Preble county, Ohio, and JOSHUA FOULKE, of Richmond, Wayne county, Indiana, have invented a certain Improvement in Vises, of which the following is a specification:

This invention relates to that class of vises in which the stock operating the movable jaw, and carrying a screw-threaded sleeve fitted to a fixed nut, is provided with a mechanism for automatically either locking it to, or unlocking it from, the said screw-threaded sleeve, so that the movable jaw can be rapidly adjusted to receive either large or small work, by simply sliding it, and then made to firmly clamp the work by the screw-feed.

Our improvement consists in combining, with the serrated side of the hexagonal stock or bar for shifting the movable jaw, an internally-toothed yoke, which is connected so as to turn and move with the sleeve, and is held in gear with the serrated stock by the force of a spring; but is, on reversing the stock to release the work, thrown out of gear by an incline or a cam on the fixed nut in which the sleeve turns.

Figure 1:
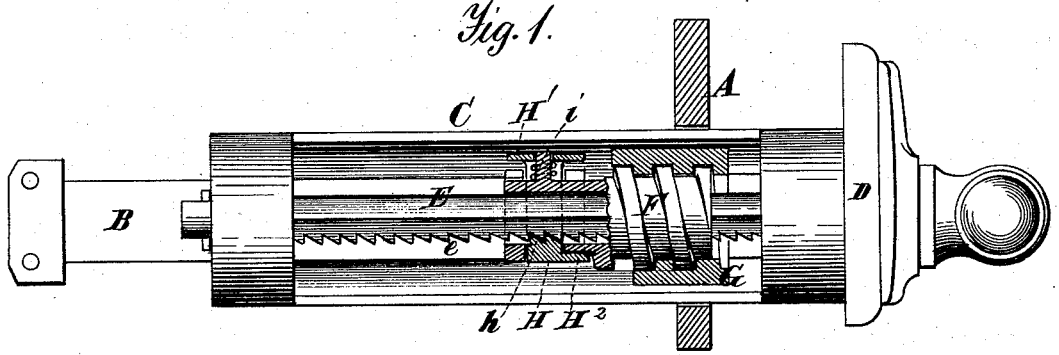
Figure 2:
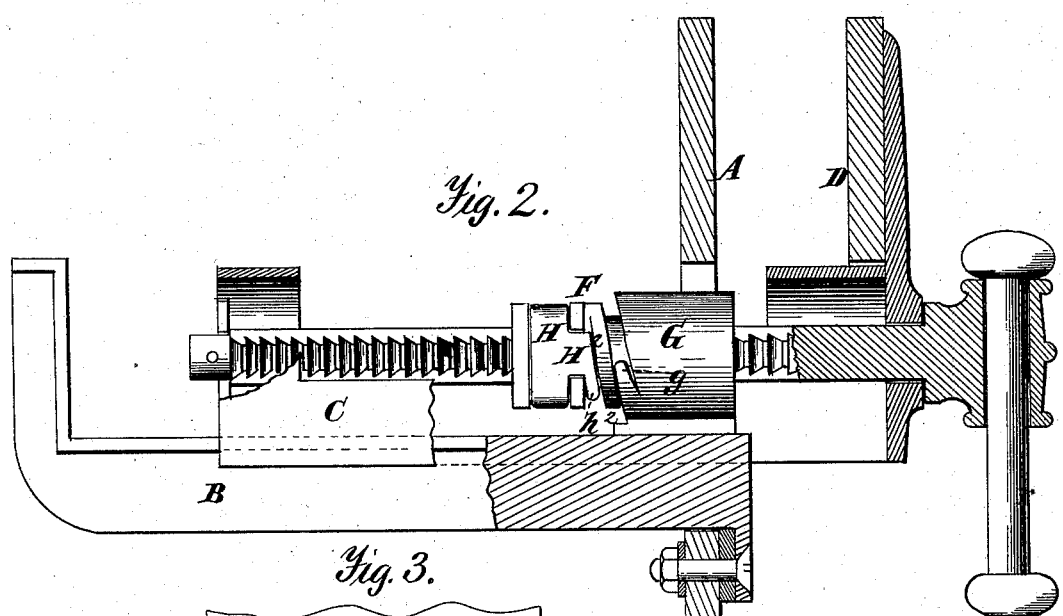
Figure 3:
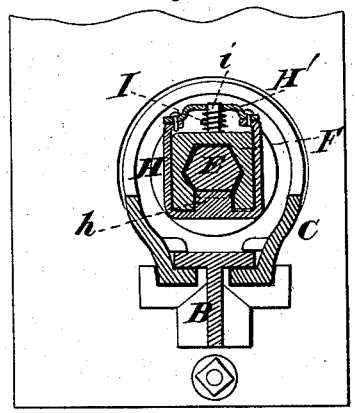
Figure 4:
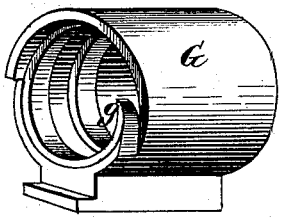

In the annexed drawings, Figure 1 is a sectional plan of our improved vise. Fig. 2 is a sectional side elevation of the same. Fig. 3 is a transverse section thereof. Fig. 4 is a perspective view, on an enlarged scale, of the nut, showing the cam-finger for releasing the yoke.

The same letters of reference are used in all the figures in the designation of identical parts.

The fixed jaw A is secured to the horizontal guide-bar B, which is of T form in cross-section, and sustains on its flat top the slide C, to which the movable jaw D is rigidly bolted—that is, to the head formed on the outer end of the slide. The movable jaw is operated through the medium of the stock or bar E, capable of turning in the turned-up ends of the slide, but incapable of moving endwise independently of the slide. It carries an externally screw-threaded sleeve, F, which is adapted to, and turns in, the nut G, fixed to the guide-bar B. The stock and sleeve are so connected together that, while they always turn together, the former may slide endwise through the aperture in the latter. In the example illustrated, the stock between the ends of the slide is of hexagonal form in cross-section, fitting a corresponding aperture in the sleeve. One of its sides is serrated, having a series of ratchet-teeth, $e$, to be engaged by the internal teeth $h$ of the yoke H, which is placed on the protuding head of the sleeve F, a suitable aperture being formed in the head, through which the teeth of the yoke can reach and interlock with the teeth on the stock. The legs of the yoke are connected by a bar, $H^1$, between which and the side of the head of the sleeve facing it a spiral spring, I, held in position by a pin, $i$, is inserted. The tension of the spring drawing on the yoke tends to hold the teeth of the latter in gear with the toothed stock E, the construction and position of the respective teeth being, however, such as to permit the stock with the movable jaw to be pushed inward, the teeth of the yoke riding over the teeth of the stock. The yoke is confined between shoulders on the head of the sleeve, and is provided with a laterally-projecting flange on the side on which the teeth $h$ are formed. This flange, $H^2$, faces the nut G, passing through a gap in the adjacent shoulder of the sleeve, and has an angularly-projecting finger, $h^2$, the under side of which, at the extreme end, stands a little distance off the surface of the sleeve, so as to permit the entrance between it and the sleeve of the wedge-shaped finger $g$, on the end of the nut G, which constitutes the terminal of the thread in the nut.

As the finger $h^2$ and flange $H^2$ are drawn over the finger $g$, in reversing the stock E to unscrew and release the work, the yoke is moved on the sleeve in opposition to the spring I, and by the time the further rotatory movement of the sleeve is checked by the nut the teeth $h$ of the yoke have been entirely disengaged from the toothed stock E, and the latter may be slid endwise through the sleeve for adjusting the movable jaw.

What we claim as our invention, and desire to secure by Letters Patent, is—

The combination of the toothed stock or bar E $e$, externally screw-threaded sleeve F, nut G, having wedge-shaped finger $g$, yoke H $h$, with flange H$^2$ $h^2$, and spring I, substantially as and for the purposes specified.

In testimony whereof we have signed our names to this specification in the presence of two subscribing witnesses.

JOSHUA HUNT.
JOSHUA FOULKE.

Witnesses for J. HUNT:
   JOHN V. CAMPBELL,
   JAMES HARBAUGH.
Witnesses for J. FOULKE:
   JOHN BELL,
   JOHN REICHERT.